(12) United States Patent
Huang

(10) Patent No.: US 11,099,357 B2
(45) Date of Patent: Aug. 24, 2021

(54) ELECTRONIC DEVICE WITH DEPLOYABLE AND RETRACTABLE CAMERA ASSEMBLY

(71) Applicant: Chiun Mai Communication Systems, Inc., New Taipei (TW)

(72) Inventor: Chun-Nan Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 32 days.

(21) Appl. No.: 16/562,876

(22) Filed: Sep. 6, 2019

(65) Prior Publication Data

US 2020/0081227 A1  Mar. 12, 2020

(30) Foreign Application Priority Data

Sep. 7, 2018  (CN) .......................... 201811044017.1

(51) Int. Cl.
*G02B 13/00* (2006.01)
*H04N 5/225* (2006.01)
(Continued)

(52) U.S. Cl.
CPC ...... *G02B 13/0015* (2013.01); *H04M 1/0264* (2013.01); *H04N 5/2254* (2013.01); *H04N 5/2257* (2013.01); *G03B 17/02* (2013.01)

(58) Field of Classification Search
CPC .. H04N 5/2254; H04N 5/2257; H04N 5/2258; H04M 1/0264; H04M 1/0235;
(Continued)

(56) References Cited

U.S. PATENT DOCUMENTS 7,474,298 B2*  1/2009  Nguyen ................ G06F 1/1624
                                                                345/156
2007/0120960 A1*  5/2007  Chang ................ H04N 1/00307
                                                                348/14.02
(Continued)

FOREIGN PATENT DOCUMENTS

CN  104301609 A  1/2015
CN  105049569 A  11/2015
(Continued)

OTHER PUBLICATIONS

English Translation of CN108388314 (Year: 2018).*

*Primary Examiner* — Lin Ye
*Assistant Examiner* — John H Morehead, III
(74) *Attorney, Agent, or Firm* — ScienBiziP, P.C.

(57) ABSTRACT

An electronic device with camera assembly which can be deployed and can be retracted allows a maximum size of display screen on a front surface of the device. The device includes a housing and at least a first lens module if not an additional and second lens module. The housing includes a front surface with a display screen and a back surface. The back surface defines a receiving groove receiving the first lens module. The first lens module is received in the receiving groove and capable of being stretching out of the receiving groove to face a front side of the electronic device when deployed, to capture a scene in front of the device. A controlling method suitable for a first lens module and/or a second lens module to capture a front scene and a rear scene is also provided.

18 Claims, 9 Drawing Sheets

(51) Int. Cl.
*G03B 17/02* (2021.01)
*H04M 1/02* (2006.01)

(58) Field of Classification Search
CPC ............... H04M 1/026; H04M 1/0266; H04M 2250/20; G03B 17/02; G03B 17/04; G02B 13/0015
See application file for complete search history.

(56) References Cited

U.S. PATENT DOCUMENTS

2015/0138314 A1\* 5/2015 Vincent .............. H04N 5/23238
348/38
2018/0292866 A1\* 10/2018 Tucker .................. G06F 1/1686
2018/0295328 A1\* 10/2018 Tucker .............. H04N 5/23293
2018/0332204 A1\* 11/2018 Chien .................... F21V 21/30

FOREIGN PATENT DOCUMENTS

| CN | 106686291 A | | 5/2017 | |
|----|-------------|---|--------|-----------|
| CN | 108388314 | \* | 4/2018 | ........... H04N 5/2253 |
| CN | 108388314 A | | 8/2018 | |

\* cited by examiner

ELECTRONIC DEVICE WITH DEPLOYABLE AND RETRACTABLE CAMERA ASSEMBLY

FIELD

The subject matter herein generally relates to imaging by portable devices.

BACKGROUND

Some electronic devices have a front camera as well as a back camera to increase the number of shooting modes. However, a front camera on a front surface of an electronic device where the display screen is also located limits a size of the display screen and restricts the electronic device to being an "all screen" or "infinity display" device.

Therefore, there is room for improvements.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings.

Specific embodiments of the present disclosure are described.

In the following description, when an element is described as being "fixed to" another element, the element can be fixed to the another element with or without intermediate elements. When an element is described as "connecting" another element, the element can be connected to the another element with or without intermediate elements.

Without a given definition, all terms used have the same meaning as commonly understood by those skilled in the art. The term "and/or" means including any and all combinations of one or more of associated listed items.

Figure 1:
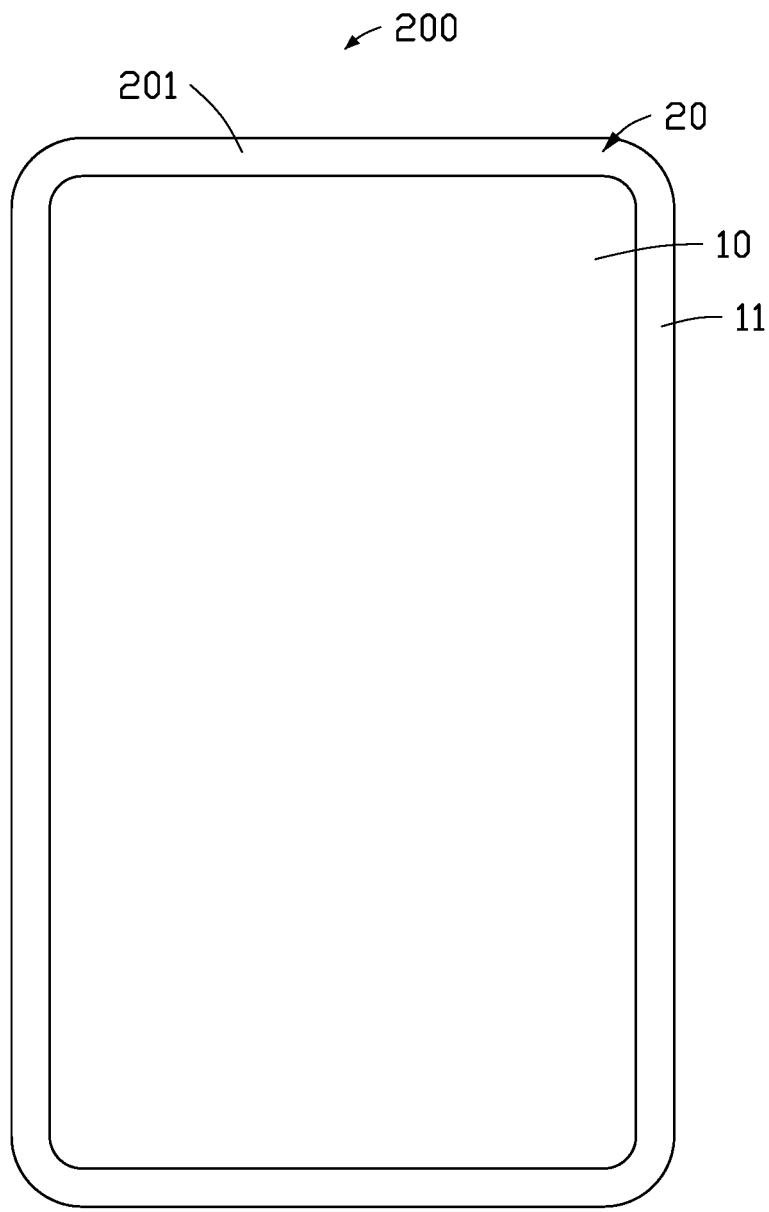
FIG. 1 is a front side view of an electronic device according to a first embodiment of the present disclosure.
Figure 2:
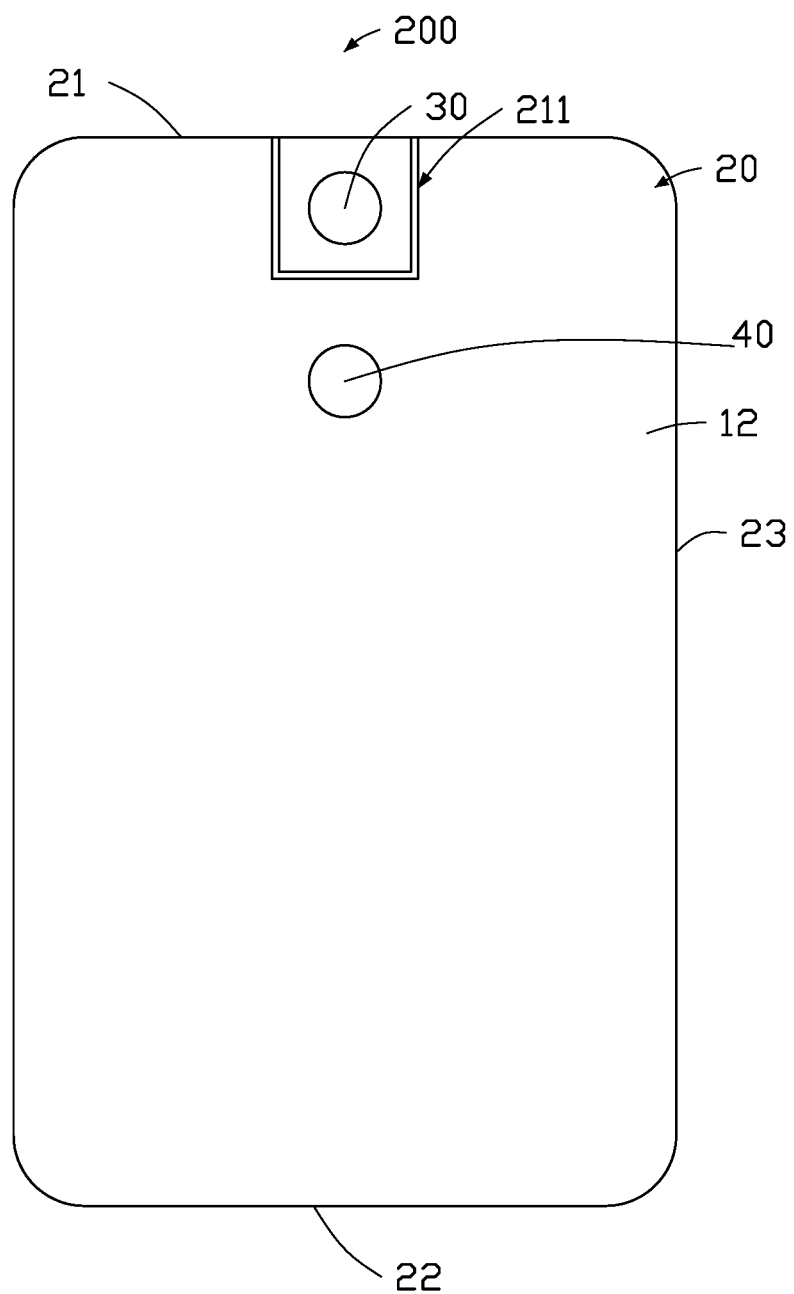
FIG. 2 is a rear side view of the electronic device of FIG. 1.

Referring to FIG. 1 and FIG. 2, a first embodiment of an electronic device 200 includes a main body 201 including a display screen 10 and a housing 20. The electronic device 200 further includes a first lens module 30, and a second lens module 40 mounted on the main body 201. The electronic device 200 may further include, but is not limited to, other mechanical structures, other electronic components, modules, and software that implement their preset functions. The electronic device 200 may be any one of various portable electronic devices such as tablet computers, smart phones, and personal digital processing devices (PDAs).

The display screen 10 can be used for display. The display screen 10 can be any type of display screen, such as an LCD (Liquid Crystal Display), an OLED (Organic Light-Emitting Diode), or the like. In the embodiment, the display screen 10 is an "infinity screen". In another embodiment, the display screen 10 is not an "infinity screen".

The main body 201 includes a front surface 11 and a back surface 12. The display screen 10 is disposed on the front surface 11. The first lens module 30 and the second lens module 40 are disposed on the back surface 12.

The housing 20 also includes a top wall 21, a bottom wall 22, and two side walls 23. The top wall 21, the bottom wall 22 and the side walls 23 corporately define a shape of the housing 20. In the embodiment, the housing 20 has a substantially rectangular shape for accommodating the display screen 10. The top wall 21, the bottom wall 22, and the side walls 23 connect the front surface 11 and the back surface 12 to form an outline of the electronic device 200. The back surface 12 of the housing 20 defines a receiving groove 211.

The receiving groove 211 is substantially rectangular. The receiving groove 211 is substantially U-shaped, and has an opening facing away from the bottom wall 22. The opening of the receiving groove 211 penetrates the top wall 21. The first lens module 30 is received in the receiving groove 211. It can be understood that in another embodiment, the receiving groove 211 can be disposed to be adjacent to either one of the bottom wall 22 and the side walls 23.

Figure 3:
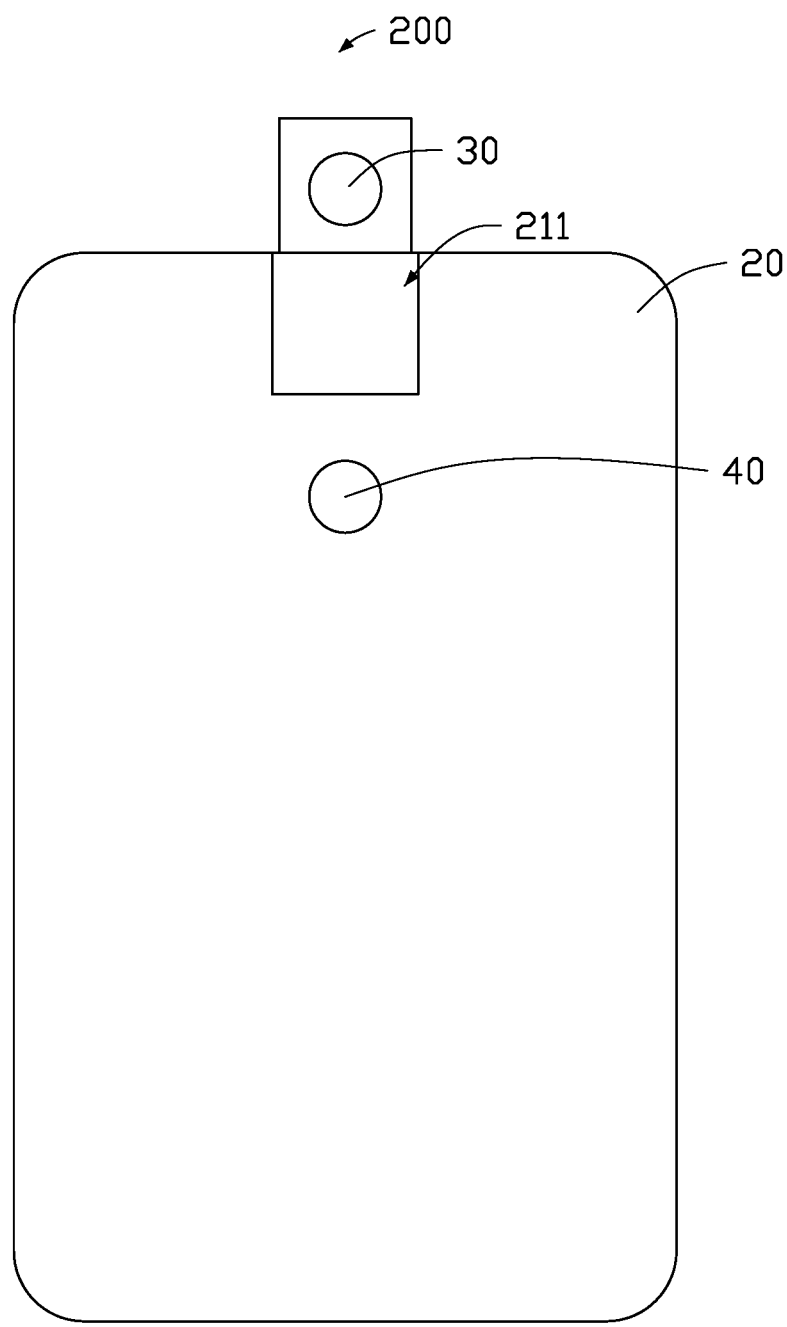
FIG. 3 is a schematic view of the electronic device of FIG. 2, with a first lens module completely deployed.

In the embodiment, as shown in FIG. 3, the first lens module 30 is slidably disposed in the receiving groove 211. The first lens module 30 can slide in the receiving groove 211 to extend out of the receiving groove 211. The first lens module 30 is prevented from sliding out and separating from the housing 20. As shown in FIG. 2, the first lens module 30 can be completely received in the receiving groove 211. In the embodiment, the shape of the receiving groove 211 is substantially the same as the shape of the first lens module 30.

The second lens module 40 is disposed on the housing 20 adjacent to the receiving groove 211. The second lens module 40 is used to capture a scene at the rear of the electronic device 200.

Figure 4:
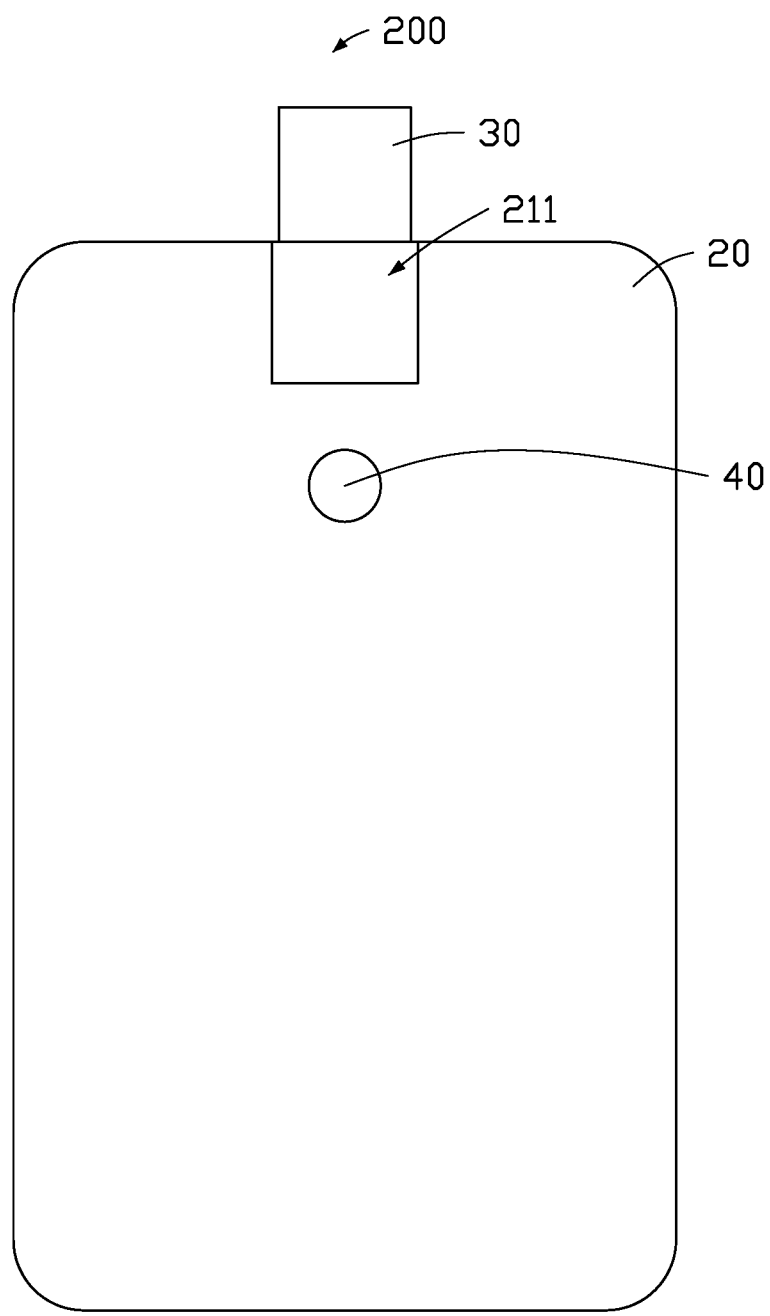
FIG. 4 is a schematic view of the electronic device of FIG. 3, with the first lens module rotated predetermined degrees.
Figure 5:
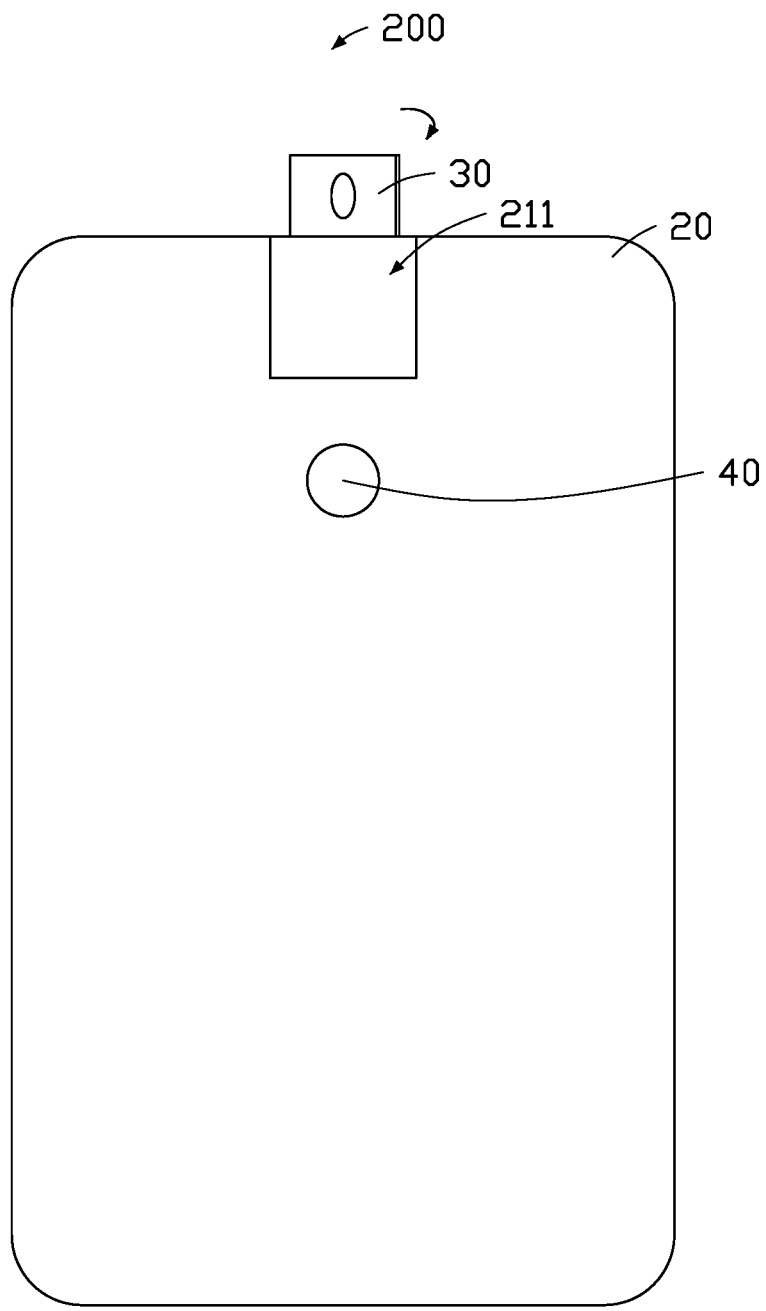
FIG. 5 is a schematic view of the electronic device of FIG. 3, with the first lens module rotated less than the predetermined degrees.
Figure 6:
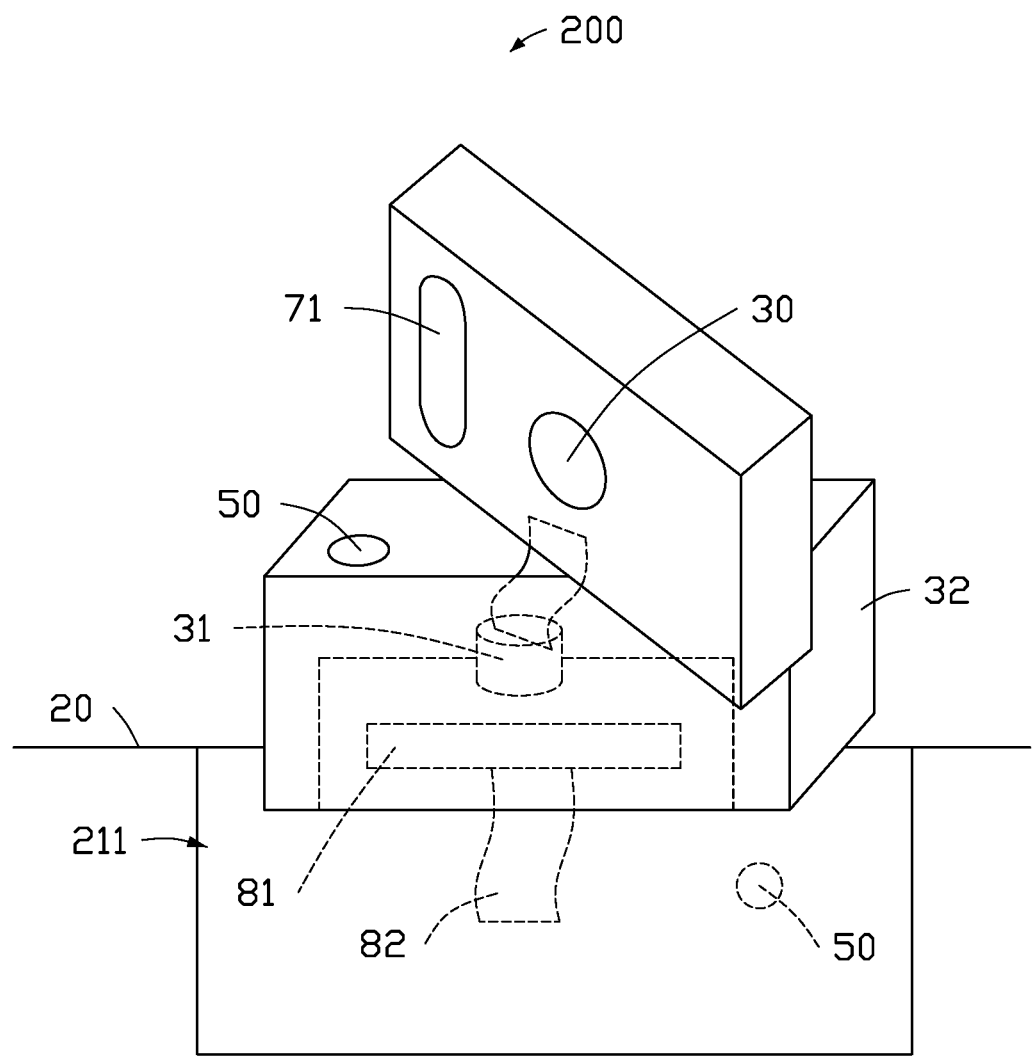
FIG. 6 is an isometric view of part of the electronic device of FIG. 5.

When the first lens module 30 is slid out of the receiving groove 211, the first lens module 30 can be rotated relative to the housing 20, so that it can be used to capture a front scene of the electronic device 200 as well as a rear scene. In the embodiment, the electronic device 200 includes a rotating member (not labeled). The first lens module 30 can be rotated relative to the housing 20 with the rotating member. As shown in FIG. 3, when not rotated with respect to the housing 20, the first lens module 30 and the second lens module 40 face a back side of the electronic device 200, and both can be used to capture the scene at the rear of the electronic device 200. As shown in FIG. 4, the first lens module 30 is rotated such as 180 degrees with respect to the housing 20 and faces a front side of the electronic device 200. The first lens module 30 thus can be used to capture the front scene of the electronic device 200. As shown in FIG. 5, the first lens module 30 can be rotated to any other angle. Referring to FIG. 6, in the embodiment, the first lens module 30 can be manually controlled by a user to slide out of the receiving groove 211 and then be rotated around a rotating shaft 31. In an alternative embodiment, the first lens module 30 can be controlled by a control unit (not shown) to automatically slide out of the receiving groove 211 and then automatically rotate around the rotating shaft 31.

The first lens module 30 and the second lens module 40 can both be used to capture the rear scene when the first lens module 30 is received in the receiving groove 211, or when the first lens module 30 is slid out of the receiving groove 211 but is not rotated relative to the housing 20.

The first lens module 30 can be used to capture the front scene and the second lens module 40 can be used to capture the rear scene when the first lens module 30 is slid out of the receiving groove 211 and rotated to face the front side of the electronic device 20. The first lens module 30 can be further rotated to any other angle with respect to the housing 20 to capture a scene at any orientation relative to the electronic device 200.

Figure 7:
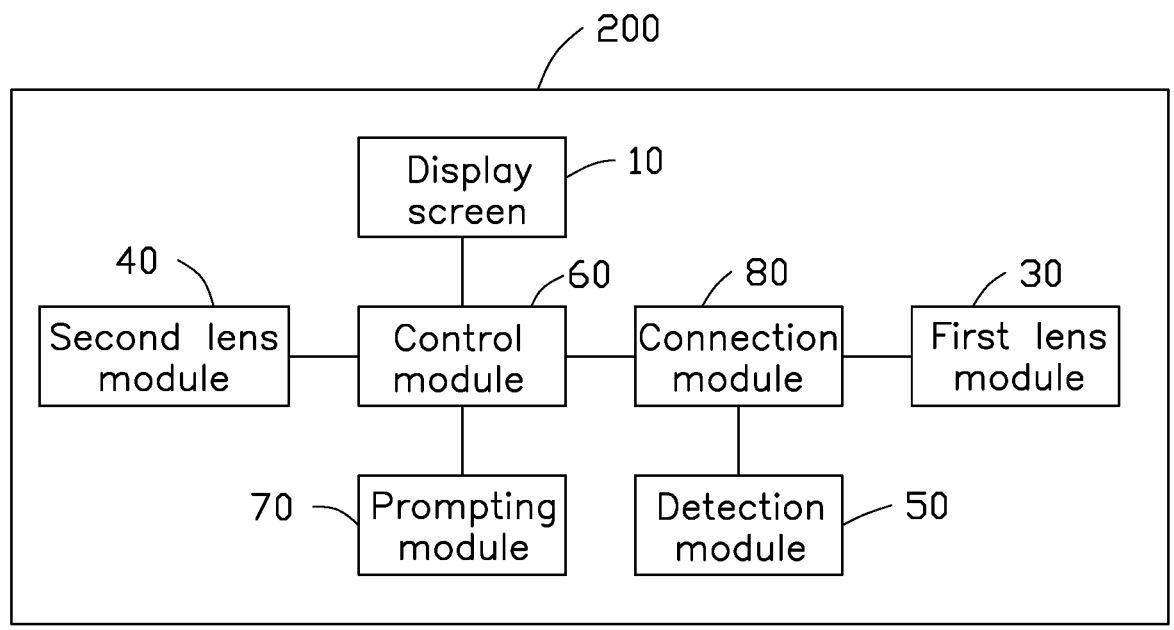
FIG. 7 is a block diagram of modules of the electronic device of FIG. 1.

Referring to FIG. 6 and FIG. 7, the electronic device 200 further includes a detection module 50, a control module 60, a prompting module 70, and a connection module 80. The detection module 50 can be disposed on the housing 20 or on a supporting member 32 which supports the first lens module 30. The detection module 50 detects whether the first lens module 30 reaches a preset position, for example, the detection module 50 detects whether the first lens module 30 is slid to a preset location and further detects whether the first lens module 30 is rotated to a preset angle. In the embodiment, the preset position is the limit of travel of the first lens module 30 out of the receiving groove 211. In an alternative embodiment, the preset position is where the first lens module 30 is completely received in the receiving groove 211.

The control module 60 can be a central processing unit, a microprocessor, or any chip with data processing functions. When a shooting instruction such as a click or other command to capture an image is received from the user, the control module 60 signals the prompting module 70 to generate a prompt message to inform the user if the first lens module 30 is not slid to the preset position and/or the first lens module 30 is not rotated to the preset angle. Incorrect shooting is thus prevented. In an alternative embodiment, the control module 60 itself stops the first lens module from incorrect shooting when a shooting instruction is received from the user but the first lens module 30 is not slid to the preset position and/or the first lens module 30 is not rotated to the preset angle.

The control module 60 is further configured to control the first lens module 30 and the second lens module 40 to perform a joint shooting operation when receiving a joint shooting instruction from the user. The joint shooting operation is that the first lens module 30 captures a first image and the second lens module 40 captures a second image, the capturing is done simultaneously. A third image that is a composite image of the first image and the second image can be generated under control of the control module 60. The third image generally has a better appearance with respect to the first image and the second image. For example, the third image may be clearer or may have a higher resolution as compared to the first image and the second image.

In some embodiments, a successful joint shooting operation requires that the first lens module 30 and the second lens module 40 are separated by a predetermined distance. Thus, the preset position of the first lens module 30 is where the first lens module 30 is spaced from the second lens module 40 for such predetermined distance. When the first lens module 30 does not reach the preset position, the control module 60 controls the prompting module 70 to prompt the user.

A prompt information may be in form of text, sound, and/or by light. The prompt information of text form is displayed on the display screen 10 to remind the user. The prompt information in sound (may be a voice) form is broadcast by a speaker module (not labeled) to remind the user. The prompt information by light form is shown by a flash 71 of the first lens module 30.

The connection module 80 is configured to electrically connect the first lens module 30, the detection module 50, and the control module 60. The connection module 80 can include a connector 81 and a signal line 82.

The first lens module 30 being slidably disposed on the back surface 12 of the electronic device 200 means that it does not occupy the front surface 11 of the electronic device 200. The size of the display screen 10 on the front surface 11 is thus not affected by the first lens module 30 and a larger size display screen 10 can be provided on the electronic device 200.

Figure 8:
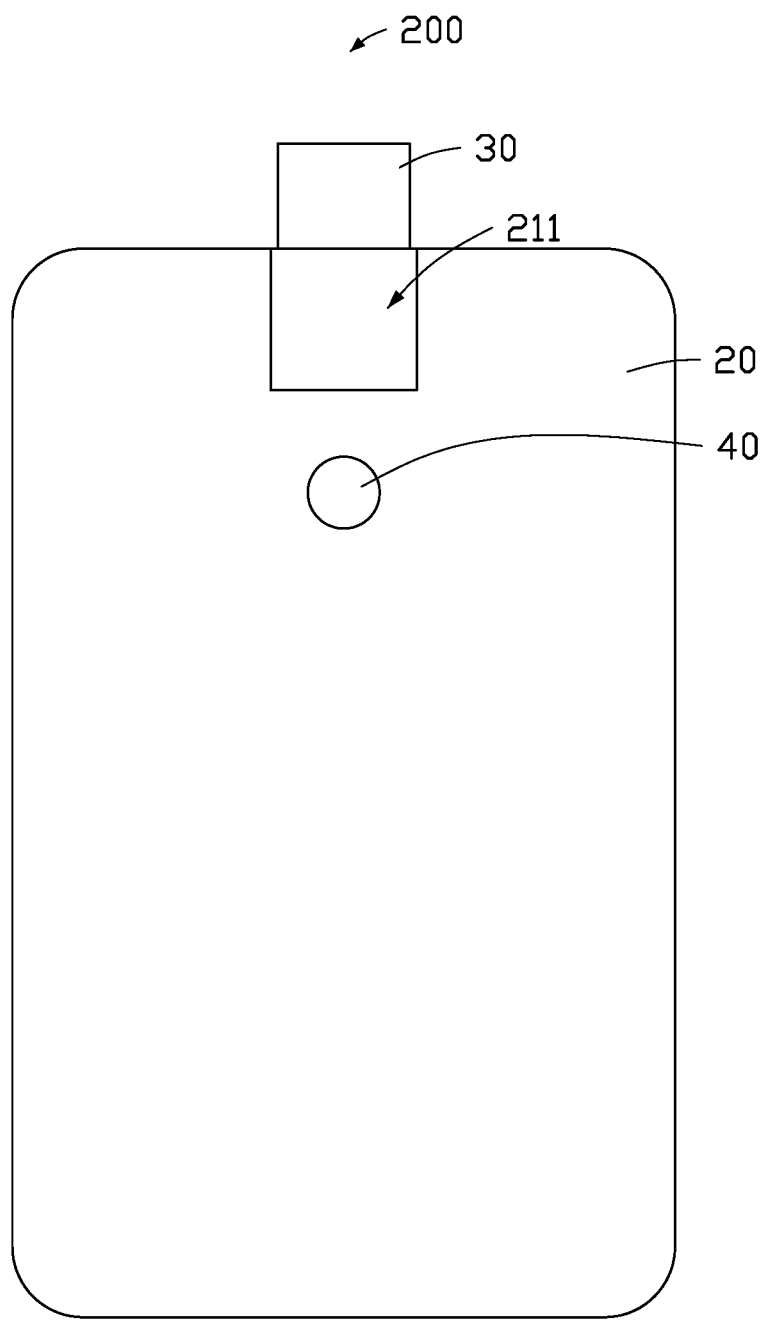
FIG. 8 is a schematic view of an electronic device according to a second embodiment of the present disclosure, with a first lens module completely deployed.

Referring to FIGS. 1 and 8, a second embodiment of an electronic device (electronic device 200) includes a main body 201 including a display screen 10 and a housing 20. The electronic device 200 further includes a first lens module 30, and a second lens module 40 mounted on the main body 201. The electronic device 200 may further include, but is not limited to, other mechanical structures, other electronic components, modules, and software that implement their preset functions. The electronic device 200 may be any one of various portable electronic devices such as tablet computers, smart phones, and personal digital processing devices (PDAs).

The display screen 10 can be used for display. The display screen 10 can be any type of display screen, such as an LCD (Liquid Crystal Display), an OLED (Organic Light-Emitting Diode), or the like. In the embodiment, the display screen 10 is an "infinity screen". In another embodiment, the display screen 10 is not an "infinity screen".

The housing 20 includes a front surface 11 and a back surface 12. The display screen 10 is disposed on the front surface 11. The first lens module 30 and the second lens module 40 are disposed on the back surface 12. The housing 20 also includes a top wall 21, a bottom wall 22, and two side walls 23. The top wall 21, the bottom wall 22 and the side walls 23 corporately define a shape of the housing 20. In the embodiment, the housing 20 has a substantially rectangular shape for accommodating the display screen 10. The top wall 21, the bottom wall 22, and the side walls 23 connect the front surface 11 and the back surface 12 to form the outline of the electronic device 200. The back surface 12 of the housing 20 defines a receiving groove 211. The receiving groove 211 is substantially rectangular and located at a substantially intermediate portion of the top wall 21. The receiving groove 211 is substantially U-shaped, and has an opening facing away from the bottom wall 22. The opening of the receiving groove 211 penetrates the top wall 21. The first lens module 30 is received in the receiving groove 211. It can be understood that in another embodiment, the receiving groove 211 can be disposed on any one of the bottom wall 22 and the two side walls 23.

The first lens module 30 is reversibly disposed in the receiving groove 211, and the first lens module 30 can be reversed or flipped relative to the housing 20 and rotated out of the receiving groove 211. In the embodiment, the flipping of the first lens module 30 may be carry out by rotating the first lens module 30 around an axis vertical to a plane in which the side walls 23 are located. The first lens module 30 can be completely flipped or unflipped in the receiving groove 211. As shown in FIG. 4, the first lens module 30 is completely flipped with respect to the housing 20, that is, the first lens module 30 is rotated for predetermined degrees such as 180 degrees out of the receiving groove 211. The first lens module 30 faces a front side of the electronic device 200, and can be used to capture a front scene of the electronic device 200. As shown in FIG. 2, the first lens module 30 is not inverted and is still received in the receiving groove 211. The first lens module 30 faces a back side of the electronic device 200, and can be used to capture a rear scene of the electronic device 200. As shown in FIG. 8, the first lens module 30 is not completely flipped. That is, the first lens module 30 is partially flipped and rotated less than the predetermined degrees such as 180 degrees. In the embodiment, the first lens module 30 can be manually controlled by a user to be flipped to any angle desired that is not greater than the predetermined degrees. In an alternative embodiment, the first lens module 30 can be automatically flipped by a control unit (not shown).

The second lens module 40 is disposed on the housing 20 adjacent to the receiving groove 211. The second lens module 40 is used to capture a rear scene of the electronic device 200.

When the first lens module 30 is completely flipped, the first lens module 30 can be used to capture the front scene of the electronic device 200, and the second lens module 40 can be used to capture a rear scene of the electronic device 200. When the first lens module 30 is received in the receiving groove 211 and is unflipped, the first lens module 30 and the second lens module 40 can both be used to capture the rear scene of the electronic device 200. In the embodiment, the first lens module 30 can be further flipped to any other angle to capture a scene around the electronic device 200.

Figure 9:
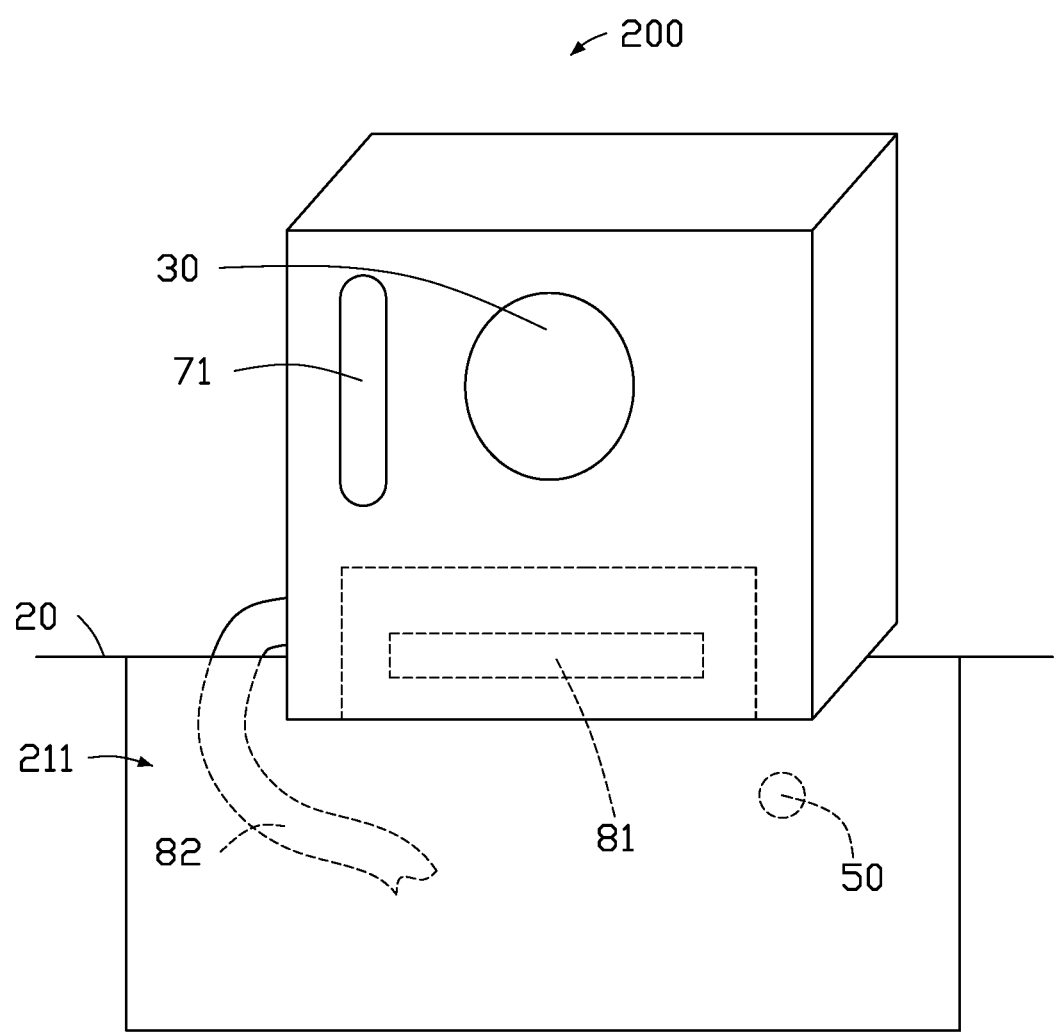
FIG. 9 is an isometric view of part of the electronic device of FIG. 8, with the first lens module flipped predetermined degrees.

As shown in FIGS. 7 and 9, the electronic device 200 further includes a detection module 50, a control module 60, a prompting module 70, and a connection module 80.

The detection module 50 is disposed on the housing 20. The detection module 50 is configured to detect an unflipped, a partially flipped, and a completely flipped state of the first lens module 30. The completely flipped state is that the first lens module 30 is flipped out of the receiving groove 211 for the predetermined degrees such as 180 degrees. The partially flipped state is that the first lens module 30 is flipped out of the receiving groove 211 for less than the predetermined degrees such as 180 degrees. The unflipped state is that the first lens module 30 is completely received in the receiving groove 211. The control module 60 can be a central processing unit, a microprocessor or any chip with data processing functions. When a shooting instruction is received from the user the control module 60 signals the prompting module 70 to generate a prompt message warning that the first lens module 30 is not completely flipped, to prevent incorrect shooting. In an alternative embodiment, the control module 60 itself stops the first lens module from incorrect shooting when a shooting instruction is received from the user but the first lens module 30 is not completely flipped.

The control module 60 is further configured to control the first lens module 30 and the second lens module 40 to perform a joint shooting operation when receiving a joint shooting instruction from the user and the first lens module 30 is at the unflipped state. The joint shooting operation is that, simultaneously, the first lens module 30 captures a first image and the second lens module 40 captures a second image. A third image that is a composite image of the first image and the second image can be generated under control of the control module 60.

The prompt information may be in form of text, sound, and/or light.

The connection module 80 is configured to electrically connect the first lens module 30, the detection module 50, and the control module 60. The connection module 80 can include a connector 81 and a signal line 82.

The first lens module 30 being reversibly disposed on the back surface 12 of the electronic device 200 means that it does not occupy the front surface 11 of the electronic device 200. The size of the display screen 10 on the front surface 11 is thus not affected by the first lens module 30 and a larger size display screen 10 can be provided on the electronic device 200.

Embodiments of a controlling method suitable for a first lens module and/or a second lens module to capture a front scene and a rear scene are also provided. In an embodiment, the method includes steps of: defining a receiving groove on a housing of an electronic device and stretchably mounting a front lens module in the receiving groove, thereby the first the first lens module being capable of capturing a rear scene when being received in the receiving groove and capable of capturing a front scene when being stretched out of the receiving groove; and providing a control module to conduct the first lens module to capture the rear scene of the electronic device when the first lens module is received in the receiving groove and a shooting instruction is received from a user, and to conduct the first lens module to capture the front scene of the electronic device when the first lens module is stretched out of the receiving groove and a shooting instruction is received from the user.

In another embodiment, the method further includes steps of: detecting whether the first lens module reaches a preset position; and generating a prompt message to inform the user or not activating the first lens module when a shooting instruction is received from the user but the first lens module does not reach the preset position. In the embodiment, the preset position is where the first lens module being completely out of the receiving groove or where the first lens module being completely received in the receiving groove.

In another embodiment, the method further includes steps of: mounting a second lens module adjacent to the receiving groove; controlling the first lens module and the second lens module by the controller to perform a joint shooting operation upon receiving a joint shooting instruction from the user; and generating a composite image. In the embodiment, the joint shooting operation is that the first lens module captures a first image and the second lens module capture a second image, the composite image is a composite of the first image and the second image.

In another embodiment, the method further includes steps of: detecting whether the first lens module reaches a preset position; and generating a prompt message to inform the user or not activating the joint shooting operation when a joint shooting instruction is received from the user but the first lens module does not reach the preset position. The preset position is where the first lens module is spaced from the second lens module for a predetermined distance.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device comprising: a housing; a receiving groove housed by the housing; and a first lens module received in the receiving groove, wherein the housing has a front surface provided with a display screen and a back surface opposite to the front surface, the first lens module is capable of being stretched out of the receiving groove to face a front side of the electronic device when being stretched out of the receiving groove, the first lens module is capable of capturing a rear scene when being received in the receiving groove and capable of capturing a front scene when being stretched out of the receiving groove, wherein the electronic device further comprises a detection module, the detection module is configured to detect whether the first lens module reaches a preset position, the preset position is that the first lens module being completely stretched out of the receiving groove or the first lens module being completely received in the receiving groove.

2. The electronic device as claimed in claim 1, further comprising a prompting module, and a control module, wherein the detection module is the prompting module is configured to generate a prompt message to inform a user of the electronic device, the control module is configured to control the prompting module to generate the prompt message when a shooting instruction is received from the user but the first lens module does not reach the preset position.

3. The electronic device as claimed in claim 2, further comprising a second lens module, wherein the second lens module is disposed on the housing adjacent to the receiving groove, the control module is further configured to control the first lens module and the second lens module to perform a joint shooting operation upon receiving a joint shooting instruction from the user and generate a composite image.

4. The electronic device as claimed in claim 3, wherein the joint shooting operation is that the first lens module captures a first image and the second lens module captures a second image, the composite image is a composite of the first image and the second image.

5. The electronic device as claimed in claim 3, wherein the preset position is where the first lens module is spaced from the second lens module for a predetermined distance.

6. The electronic device as claimed in claim 1, wherein stretching the lens module out of the receiving groove comprises sliding, moving or flipping the lens module out of the receiving groove.

7. The electronic device as claimed in claim 1, further comprising a control module, wherein the control module is configured to stop the first lens module from performing a shooting operation when a shooting instruction is received from the user but the first lens module does not reach the preset position.

8. The electronic device as claimed in claim 7, wherein the preset position is where the first lens module being completely out of the receiving groove or where the first lens module being completely received in the receiving groove.

9. The electronic device as claimed in claim 7, further comprising a second lens module, wherein the second lens module is disposed on the main body adjacent to the receiving groove, the control module is further configured to control the first lens module and the second lens module to perform a joint shooting operation upon receiving a joint shooting instruction from the user and generate a composite image.

10. The electronic device as claimed in claim 9, wherein the joint shooting operation is that the first lens module captures a first image and the second lens module capture a second image, the composite image is a composite of the first image and the second image.

11. The electronic device as claimed in claim 9, wherein the preset position is where the first lens module is spaced from the second lens module for a predetermined distance.

12. The electronic device as claimed in claim 7, wherein when the first lens module does not reach the preset position, the control module is further configured to not activate the joint shooting operation even through the user's joint shooting instruction is received.

13. A controlling method, suitable for a first lens module and/or a second lens module to capture a front scene and a rear scene, the controlling method comprising:
   a) defining a receiving groove on a housing of an electronic device and stretchably mounting a first lens module in the receiving groove, thereby the first lens module being capable of capturing a rear scene when being received in the receiving groove and capable of capturing a front scene when being stretched out of the receiving groove;
   b) providing a control module to conduct the first lens module to capture the rear scene of the electronic device when the first lens module is received in the receiving groove and a shooting instruction is received from a user, and to conduct the first lens module to capture the front scene of the electronic device when the first lens module is stretched out of the receiving groove and a shooting instruction is received from the user; and
   detecting whether the first lens module reaches a preset position, wherein the preset position is where the first lens module being completely out of the receiving groove or where the first lens module being completely received in the receiving groove.

14. The method as claimed in claim 13, further comprising:
   detecting whether the first lens module reaches a preset position; and
   generating a prompt message to inform the user or not activating the first lens module when a shooting instruction is received from the user but the first lens module does not reach the preset position.

15. The method as claimed in claim 13, further comprising: mounting a second lens module adjacent to the receiving groove; wherein step b) further comprises: controlling the first lens module and the second lens module to perform a joint shooting operation by the controller upon receiving a joint shooting instruction from the user; and generating a composite image.

16. The method as claimed in claim 15, wherein the joint shooting operation is that the first lens module captures a first image and the second lens module capture a second image, the composite image is a composite of the first image and the second image.

17. The method as claimed in claim 15, further comprising:
   generating a prompt message to inform the user or not activating the joint shooting operation when a joint shooting instruction is received from the user but the first lens module does not reach the preset position.

18. The method as claimed in claim 17, wherein the preset position is where the first lens module is spaced from the second lens module for a predetermined distance.

* * * * *